(12) United States Patent
Bergler et al.

(10) Patent No.: US 7,752,660 B2
(45) Date of Patent: Jul. 6, 2010

(54) TRANSMISSION ERROR RESISTANT READER STATION

(75) Inventors: Heimo Bergler, St. Ruprecht (AT); Wolfgang Meindl, Graz (AT); Klaus Ully, Graz (AT)

(73) Assignee: NXP B.V., Eindhoven (NL)

( * ) Notice: Subject to any disclaimer, the term of this patent is extended or adjusted under 35 U.S.C. 154(b) by 1327 days.

(21) Appl. No.: 10/514,522

(22) PCT Filed: Apr. 23, 2003

(86) PCT No.: PCT/IB03/01707

§ 371 (c)(1), (2), (4) Date: Nov. 13, 2004

(87) PCT Pub. No.: WO03/098531

PCT Pub. Date: Nov. 27, 2003

(65) Prior Publication Data

US 2005/0223280 A1 Oct. 6, 2005

(30) Foreign Application Priority Data

May 15, 2002 (EP) .................................. 02100497

(51) Int. Cl.
| | |
|---|---|
| G06F 9/00 | (2006.01) |
| G06F 15/16 | (2006.01) |
| G06F 17/00 | (2006.01) |
| G06F 7/04 | (2006.01) |
| G06F 17/30 | (2006.01) |
| G06F 11/00 | (2006.01) |
| G06F 15/177 | (2006.01) |
| G06F 15/173 | (2006.01) |
| G06F 3/00 | (2006.01) |
| G06F 9/44 | (2006.01) |
| G06F 9/46 | (2006.01) |
| G06F 13/00 | (2006.01) |
| H04N 7/16 | (2006.01) |
| H04L 9/32 | (2006.01) |
| B41K 3/38 | (2006.01) |
| H04K 1/00 | (2006.01) |
| G06K 5/04 | (2006.01) |

(52) U.S. Cl. .......................... 726/14; 726/26; 713/168; 380/59; 380/255; 380/287; 714/100; 714/699; 709/200; 709/220; 709/223; 709/227; 709/230; 719/310; 719/313; 719/318

(58) Field of Classification Search .................... 726/14
See application file for complete search history.

(56) References Cited

U.S. PATENT DOCUMENTS 5,054,035 A * 10/1991 Tarallo et al. ............... 375/225

(Continued)

FOREIGN PATENT DOCUMENTS

| EP | 0 935 211 | 8/1999 |
|---|---|---|
| WO | WO 01 37202 | 5/2001 |

*Primary Examiner*—Nasser Moazzami
*Assistant Examiner*—Oscar A Louie

(57) ABSTRACT

Provided in a reception device (10) for receiving a transmission signal (US) in which, adhering to a communications protocol, reception data (ED) can be transmitted to the reception device (10) from a transmission device (2, 3) are reception means (12) for receiving the transmission signal (US), and evaluation means (16) for evaluating the received transmission signal (US) and for emitting a bit sequence (BFT) received in the transmission signal (US), which bit sequence (BFT) may contain bits of reception data (ED) transmitted from the transmission device (2, 3) but also bits (SB) occasioned by an interference to the transmission signal (US), and checking means (18) for checking whether the received bit sequence (BFT) infringes a rule of the communications protocol, wherein the reception device (10) is designed to continue with the reception of the transmission signal (US) and the checking of the received bit sequence (BFT) following the occurrence of an infringement of the communications protocol.

30 Claims, 3 Drawing Sheets

U.S. PATENT DOCUMENTS 5,343,461 A * 8/1994 Barton et al. ............... 370/249
5,818,348 A * 10/1998 Walczak et al. ............ 340/10.3
6,115,735 A * 9/2000 Saito .......................... 709/200

* cited by examiner

TRANSMISSION ERROR RESISTANT READER STATION

The invention relates to a reception device for receiving a transmission signal in which, adhering to a communications protocol, reception data can be transmitted to the reception device from a transmission device, with reception means for receiving the transmission signal and with evaluation means for evaluating the received transmission signal and for emitting a bit sequence received in the transmission signal, which bit sequence may contain bits of reception data transmitted from the transmission device but also bits occasioned by an interference to the transmission signal, and with checking means for checking whether the received bit sequence infringes a rule of the communications protocol.

The invention further relates to a reception method for receiving a transmission signal in which, adhering to a communications protocol, reception data can be transmitted to the reception device from a transmission device, wherein the following steps are followed:

reception of the transmission signal;

evaluation of the received transmission signal and emission of a bit sequence received in the transmission signal, which bit sequence may contain bits of reception data transmitted from the transmission device but also bits occasioned by an interference to the transmission signal;

checking of whether the received bit sequence infringes a rule of the communications protocol.

A reception device of this kind and a reception method of this kind are known from document U.S. Pat. No. 5,818,348. This document publishes a system comprising a base station and multiple transponders, wherein the base station communicates with one transponder at a time in accordance with a communications protocol. During this communication, the base station may interrogate reception data stored in the transponder, whereupon the transponder, which hereby forms a transmission station, transmits the reception data, in a transmission signal, to the base station, which hereby forms a reception device.

During transmission of the reception data in the transmission signal from the transponder to the base station, interference to the transmission signal may occur, especially as a result of the superimposition of interference signals, which interference may give rise to errors in the reception data received by the base station. If an interference signal of this kind occurs periodically and the periodicity coincides roughly with the duration of a "high" or "low" period of a bit in the transmission signal, the risk of receiving incorrect reception data in the base station is relatively great.

In order to ensure the greatest possible protection in the transmission of the reception data, security data is additionally included in the reception data in the case of the known system. Security data of this kind comprises framebit sequences at specific bit positions in the transmission signal to indicate the start, the end and certain areas of the reception data, and redundancy information to protect parts of the reception data against bit errors. In addition, certain transmission times are stipulated by the communications protocol. By this means it is achieved that errors that are very likely to be occasioned by the transmission can be recognized in the transmission signal. If transmission errors of this kind are recognized in the known base station through evaluation of the security data and the anticipated transmission times, the base station will again interrogate the reception data from the transponder.

In the known base station and the known reception method, it has proved a disadvantage that, every time a transmission error is recognized in the base station, the entire reception data has to be interrogated again, which considerably lengthens communication with the transponder. Since the base station, for example a toll calculation system or ticket system, has to communicate with a multiplicity of transponders in a very short space of time, any lengthening of communication with an individual transponder is very disadvantageous.

It is an object of the invention to create a reception device in accordance with the generic type specified in the first paragraph above, and a reception method in accordance with the generic type specified in the second paragraph above, in which the disadvantages specified above are avoided. In order to achieve the object specified above, a reception device of this kind is designed to continue with the reception of the transmission signal and the checking of the received bit sequence following the occurrence of an infringement of the communications protocol.

In order to achieve the object specified above, a reception method of this kind is designed to continue with the reception of the transmission signal and the checking of the received bit sequence following the occurrence of an infringement of the communications protocol.

It is achieved by means of the features in accordance with the invention that, in accordance with the reception method, the reception device continues with the reception and evaluation of the transmission signal even if an infringement of the communications protocol has been detected. An infringement of the communications protocol may be detected, on the one hand, through the evaluation of the received bit sequence and the checking of the security data contained therein, or through the checking of adherence to the transmission times determined by the communications protocol. As a result, a periodic interference signal, for example, which has been wrongly evaluated by the evaluation means as a bit sequence and cannot be recognized at the analog signal level, can be recognized and filtered out at bit level without the reception data having to be requested again by the reception device. Communication of the reception device with the transmission device can thereby advantageously be considerably accelerated.

In accordance with the measures claimed in claim 2 and claim 11, the advantage is obtained that communication error information indicating the infringed rule of the communications protocol can be emitted to a higher protocol level (e.g. application level) of the software of the reception device in order to enable an error analysis and the display of the infringed rule of the communications protocol.

It may be stipulated in the communications protocol that, from the start of a reception period for receiving the reception data, a lead period must first be awaited before the transmission device is allowed to begin transmitting the transmission signal. In accordance with the measures claimed in claim 3 and claim 12, the advantage is obtained that bits occasioned by an interference signal before the expiry of the lead period and received in the reception device are rejected and not incorrectly interpreted as reception data.

In accordance with the measures claimed in claim 4 and claim 13, the advantage is obtained that, if an error is detected in the reception data received thus far as a result of evaluation of the redundancy information, only the reception data received thus far is rejected, and the reception and evaluation of the transmission signal are continued.

In accordance with the measures claimed in claim 5 and claim 14, the advantage is obtained that the evaluation of the received bit sequence at bit positions stipulated by the communications protocol reveals whether the predetermined framebit sequence is contained in the transmission signal and that therefore valid reception data has been received.

In accordance with the measures claimed in claim 6 and claim 15, the advantage is obtained that all bits in the bit sequence received following the expiry of a maximum reception period stipulated by the communications protocol are immediately rejected and therefore can be filtered out at bit level.

In accordance with the measures claimed in claim 7, a particularly reliable communication is obtained between a base station comprising the reception device and a transponder.

In accordance with the measures claimed in claim 8, a particularly cost-effective realization of the reception device is obtained.

In accordance with the measures claimed in claim 9 and claim 16, the advantage is obtained that, irrespective of the number of bits to be transmitted in the reception data, the same maximum reception period can be stipulated.

The invention will be further described with reference to examples of embodiments shown in the drawings, to which, however, the invention is not restricted.

Figure 1:
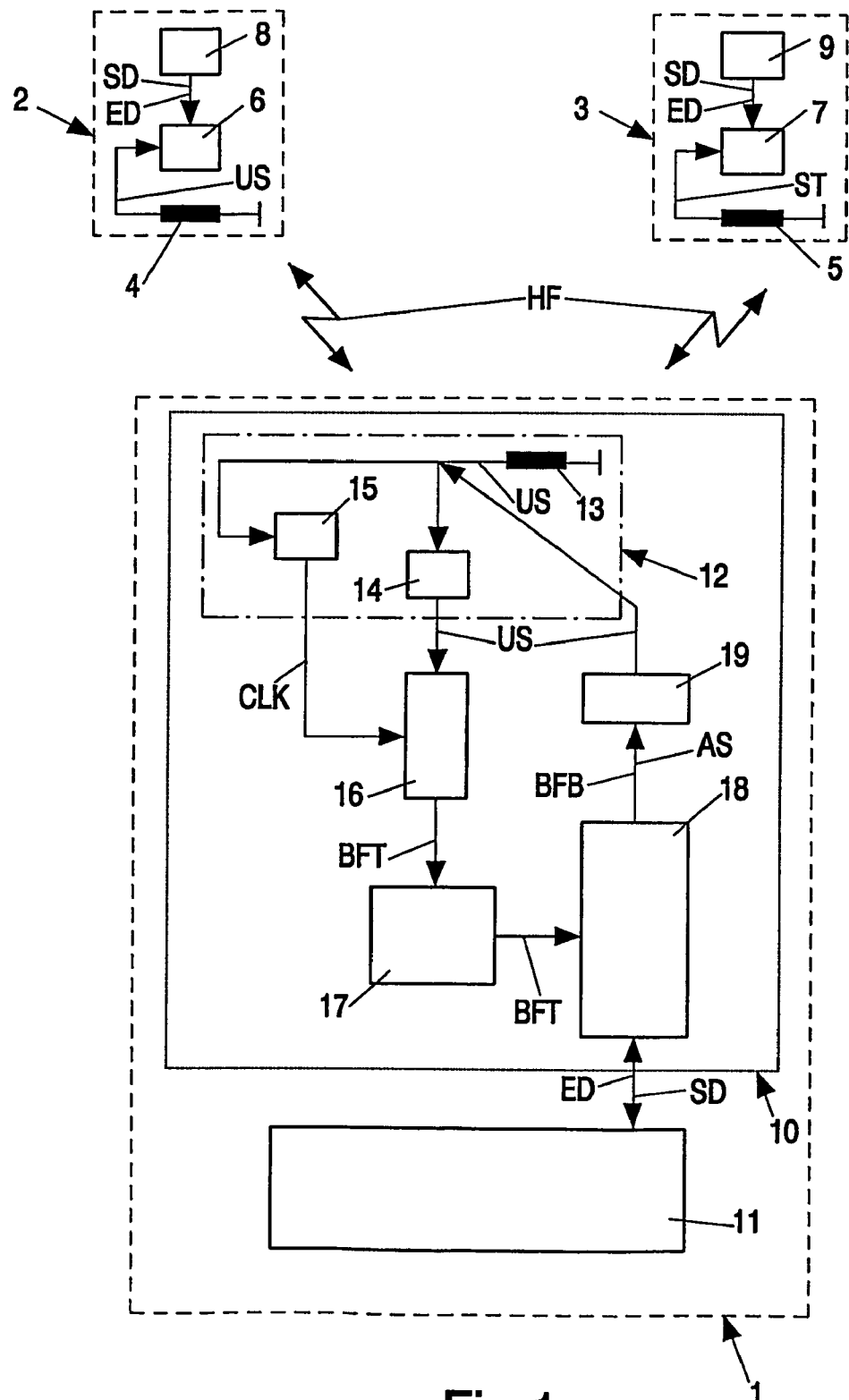
FIG. 1 shows a base station that communicates with transponders in accordance with a reception method.

FIG. 1 shows a base station 1, which forms a reception device, and a first transponder 2 and a second transponder 3, which both form transmission devices. Base station 1 is designed for receiving a transmission signal US transmitted in an electromagnetic field HF, in which transmission signal, adhering to a communications protocol, reception data ED can be transmitted from transponders 2 and 3 to base station 1.

It is stipulated in the communications protocol that, in addition to the reception data ED to be transmitted, security data is also transmitted in order to ensure the greatest possible security during transmission of the reception data ED. Security data of this kind comprises framebit sequences at certain bit positions in the transmission signal US in order to indicate the start, the end and certain areas of the reception data ED. In the communications protocol, a start framebit sequence SOF is defined, which is transmitted before the transmission of a block of reception data ED. Further, an end framebit sequence EOF is defined, which is transmitted at the end of each block of reception data ED.

Figure 3:
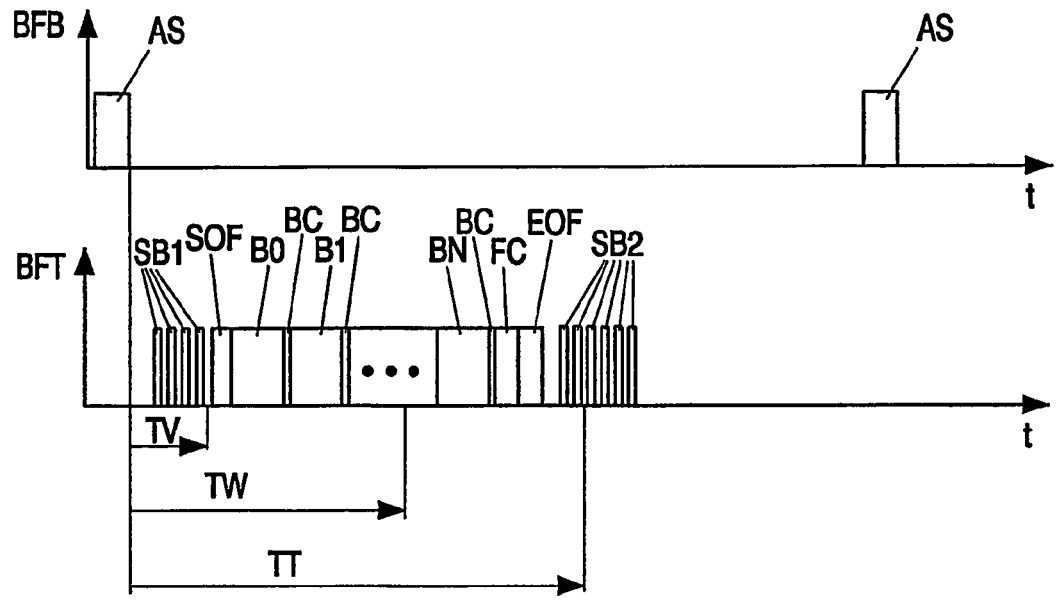
FIG. 3 shows bit sequences contained in a transmission signal in accordance with a first embodiment, which bit sequences comprise both bits of reception data transmitted from the transponder to the base station and bits occasioned by an interference to the transmission signal.

In the communications protocol, redundancy information is also defined in order to protect parts of the reception data ED against bit errors. Specific transmission times are also defined by the communications protocol, and these will be described in greater detail below with reference to FIGS. 3 and 4. A communications protocol of this kind is defined in accordance with, for example, the standard ISO/ISC 15.693.

Transponders 2 and 3 comprise an antenna 4 and 5 respectively, processing means 6 and 7 respectively and storage means 8 and 9 respectively, and their operating modes are the same. By virtue of antenna 4, transponder 2 is designed to receive the field HF generated and emitted from base station 1, which field is further processed in transponders 2 and 3 as transmission signal US. In the field HF, transmission data SD is transmitted from base station 1 to transponder 2 by pulse-interval modulation of the transmission signal US, and reception data ED is transmitted from transponder 2 to base station 1 by load modulation of the transmission signal US. Field HF hereby has a frequency of 13.56 MHz.

The processing means 6 of transponder 2 is designed for demodulating the transmission data SD transmitted from base station 1 to transponder 2 in transmission signal US and pulse-interval modulated, which transmission data can be stored in storage means 8 following demodulation by processing means 6. Processing means 6 is further designed for generating a supply voltage for transponder 2 from electromagnetic field HF, wherein transponder 2 is a passive transponder 2.

If transponder 2 is provided at a relatively great distance from base station 1, so that the field HF received with antenna 4 is relatively weak, processing means 6 switches into a power-down mode, in which the processing is stopped and virtually no power is consumed in transponder 2 until the supply voltage obtained from field HF by processing means 6 and stored in a capacitor is again sufficiently great. This activation and deactivation of the Power Down mode in transponder 2 loads field HF in a similar way to load modulation. It may happen that the period of time between activation and deactivation of the Power Down mode corresponds roughly to the particular period of time which corresponds to the "high" or "low" time period of a bit "1" or "0" of reception data ED transmitted from transponder 2 to base station 1 in transmission signal US. A transponder 2 or 3 provided at the edge of field HF can thereby become a source of interference which periodically loads and relieves field BY and superimposes on transmission signal US containing the reception data ED an interference signal ST with interference bits SB.

Base station 1 comprises a reception device 10 and an interface device 11, and forms a ticket machine, wherein travelers on a subway can pay the fare for their subway journey by introducing transponder 2 or 3, which hereby form electronic tickets. The interface device 11 hereby comprises a microcomputer, which is connected to a computer network linking the ticket machines. The interface device further comprises a display for displaying information important to travelers, such as the fact that credit stored in storage means 8 or 9 with the electronic ticket is insufficient for paying the fare.

Reception device 10 comprises reception means 12, which is formed by an antenna 13, a filter stage 14 and clock signal means 15. The transmission signal US, transmitted in field HF, can be received with antenna 13 and comprises the reception data ED transmitted from transponder 2 or 3 to base station 1, and possibly interference bits SB. Transmission signal US can be fed to both filter stage 14 and clock signal means 15.

Clock signal means 15 is designed for diverting a system clock CLK from field HF, and for emitting system clock CLK to evaluation means 16 of base station 1. Filter stage 14 comprises analog filters, which filter out undesired high-frequency and low-frequency signal components of transmission signal US. The filtered analog transmission signal US can be fed to evaluation means 16.

Evaluation means 16 is designed for evaluating the received transmission signal US and for emitting a reception-bit sequence BFT received in transmission signal US, which bit sequence may comprise reception bits EB of reception data ED transmitted from transponder 2 or 3, but also interference bits SB occasioned by an interference to the transmission signal US. Evaluation means 16 comprises a demodulator for demodulating the transmission signal US, load-modulated by transponder 2 or 3, and emits reception-bit sequence BFT to buffer storage means 17 of base station 1. Buffer storage means 17 is formed by a RAM (Random Access Memory) and stores the bits of reception-bit sequence BFT emitted by evaluation means 16.

Base station 1 is further equipped with checking means 18 for checking whether the received reception-bit sequence BFT infringes any rule of the communications protocol. It is hereby checked whether valid framebit sequences and redundancy information can be found in reception-bit sequence BFT, and whether the prescribed transmission times have been adhered to. If an infringement of the communications protocol has been detected, checking means 18 is designed to emit communication error information KFI to the interface device 11, further details of which will be given below.

Checking means 18 is further designed for emitting transmission data SD to transmission means 19 of reception device 10, which transmission data SD is to be transmitted to transponder 2 and/or to transponder 3 in field HF. Transmission means 19 is designed for generating the transmission signal US, which has a frequency of 13.56 MHz. Transmission means 19 further comprises a modulator for pulse-interval modulation of the transmission signal US with transmission data SD, as is generally known.

The further mode of operation of base station 1 will be described in greater detail below, as will the advantages of reception device 10 with reference to a reception method EV illustrated in FIG. 2 and a first embodiment. In accordance with the first embodiment, it is assumed that Mr. Müller possesses an electronic ticket to pay the fare for subway journeys, and that transponder 2 is provided in this. Mr. Müller holds transponder 2 in electromagnetic field HF in order to pay the fare, whereupon transponder 2 and base station 1 start to communicate in accordance with the rules of the communications protocol. It is further assumed that transponder 3 is located at the edge of electromagnetic field HF and therefore, as described above, interference signal ST is superimposed on transmission signal US.

In accordance with the communications protocol, base station 1 has to interrogate the credit stored in transponder 2 in order to establish whether the stored credit is sufficient for the fare to be debited against the stored credit. To this end, the reception method EV followed by base station 1 starts at a block 20 shown in FIG. 2.

Figure 2:
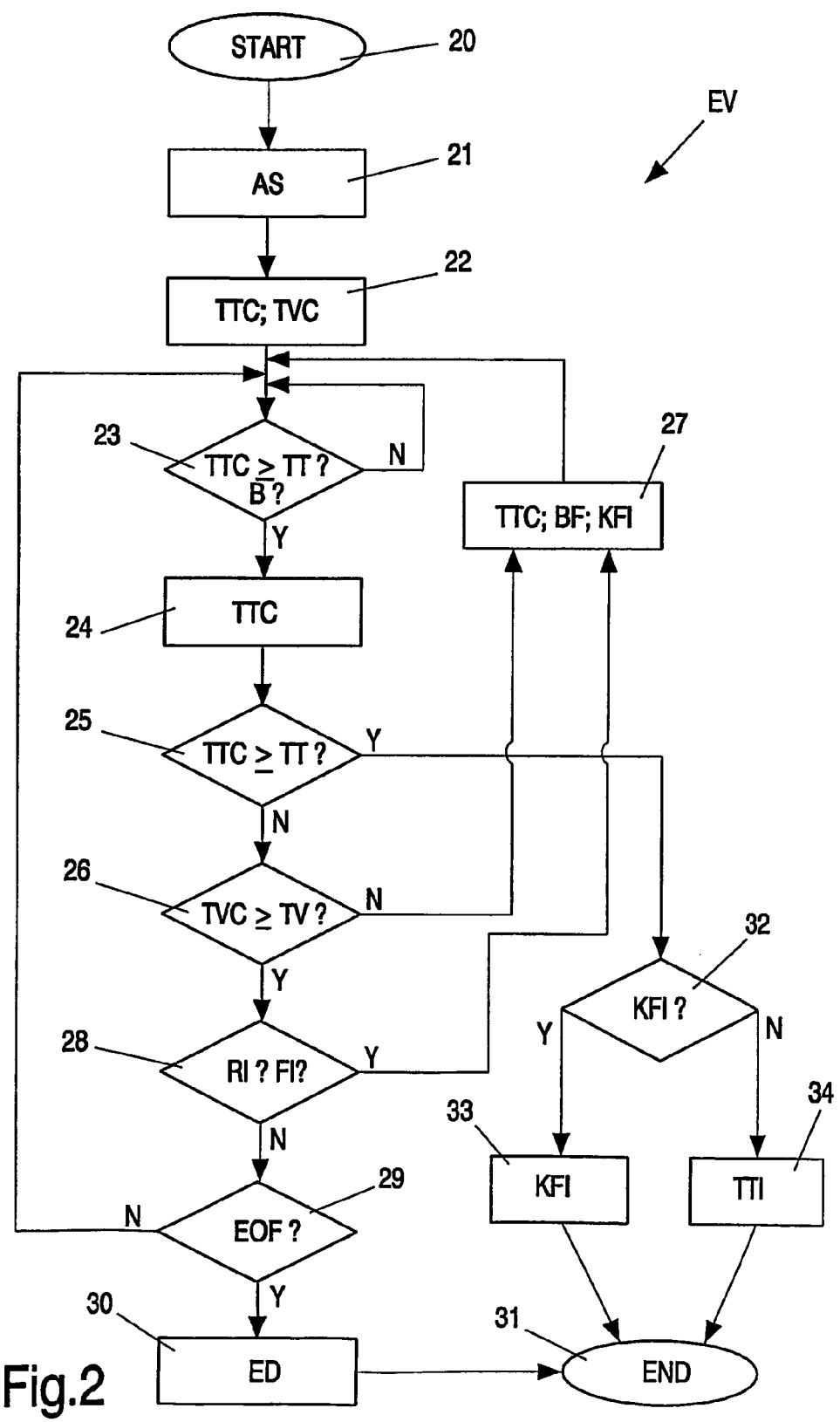
FIG. 2 shows a flowchart of the reception method.

In a subsequent block 21, checking means 18 transmits a prompt signal AS shown in FIG. 2 as a transmission-bit sequence BFB to transmission means 19, which prompt signal AS is transmitted via antenna 13 in field HF to transponder 2. A reception period defined in the communications protocol starts from the trailing edge of prompt signal AS onwards.

In a block 22, a reception-period counter TTC provided in checking means 18, and a lead-period counter TVC provided in checking means 18 are activated from the start of the reception period and start to count from counter value "0" upwards. Also activated in block 22 is the reception operating mode of base station 1 for receiving reception data ED from transponder 2.

It is stipulated in the communications protocol that, within a lead period TV starting from the start of the reception period from transponder 2 to base station 1, no reception data ED is to be transmitted. It is likewise stipulated that, on expiry of a maximum reception period TT, no more reception data ED is to be transmitted from transponder 2 to base station 1.

In a block 23, checking means 18 checks whether the counter reading currently stored in the reception-period counter TTC has already exceeded the maximum reception period TT and/or whether a bit from the reception-bit sequence BFT has already been received. If neither one nor the other condition is fulfilled, the progressing of reception method EV remains at block 23.

In accordance with the first embodiment, the interference signal ST generated by transponder 3 and superimposed on transmission signal US is received with antenna 13 and not filtered out by filter stage 14 since the frequency of interference signal ST corresponds roughly with the frequency at which bits of reception data ED are transmitted from transponder 2 to base station 1 in accordance with the communications protocol. Evaluation means 16 evaluates the received interference signal ST and emits interference bits SB1 to buffer storage means 17. At this instant, checking means 18 establishes at block 23 that a bit from reception-bit sequence BFT has already been received, and stops reception-period counter TTC at block 24.

In a subsequent block 25, checking means 18 checks whether the counter reading currently stored in the reception-period counter TTC has already exceeded the maximum reception period TT, which is not the case at this time. At a block 26, checking means 18 checks whether the counter reading currently stored in the lead-period counter TVC has already exceeded the lead period TV. Checking means 18 hereby establishes that interference bits SB1 have already been received before the expiry of lead period TV and therefore a first rule of the communications protocol has been infringed. In this case, checking means 18 is designed to reject or to erase interference bits SB1 stored in buffer storage means 17, whereupon the reception method EV is continued at a block 27.

As a result, the advantage is obtained that, although interference bits SB1 infringing the first rule of the communications protocol have been received, reception method EV is further progressed by reception device 10 and not started again from the beginning by transmitting a new prompt signal AS to transponder 2. As a result, the transmission of reception data ED can be undertaken rapidly and reliably, as will be described in greater detail below.

In block 27, the reception-period counter TTC, which was previously deactivated at block 24, is re-activated, interference bits SB1 are erased from buffer storage means 17 and communication error information KFI, indicating the first rule of the communications protocol, is stored in checking means 18.

As a result of the deactivation of reception-period counter TTC during the check of whether a rule of the communications protocol has been infringed, the advantage is obtained that the maximum reception period TT does not depend on the number of bits transmitted in reception data ED.

In accordance with the embodiment, transponder 2 transmits the start framebit sequence SOF immediately on expiry of the lead period TV, and then the bits of the reception data in blocks B0, B1 to BN. Subsequent to each block, transponder 2 transmits block codes, and subsequent to the last block BN, transponder 2 transmits framecodes FC as redundancy information. Finally, the transponder transmits the end framebit sequence EOF and thereby terminates transmission of the reception data ED. While transponder 2 is sending reception data ED, interference bits SB are not evaluated by evaluation stage 16 since—owing to the relatively great distance of transponder 3 from base station 1—the interference bits are contained only very weakly in transmission signal US.

Checking means 18 continuously checks whether the bits of the reception-bit sequence BFT stored in buffer storage means 17 by evaluation means 16 comply with the rules of the communications protocol. With each newly received bit of reception-bit sequence BFT, blocks 23, 24, 25 and 26 are hereby run through, wherein continuation is at block 28.

At block 28, checking means 18 checks whether the block codes BC of the individual blocks B0 to BN match the bits of blocks B0 to BN. If an error in a block is detected, a second rule of the communications protocol has been infringed.

At block 28, checking means 18 further checks whether start framebit sequence SOF and end framebit sequence EOF correspond to the stipulations of the communications protocol. Start framebit sequence SOF may, for instance, be identified by a bit sequence "111", and end framebit sequence EOF by a bit sequence "101". It may be stipulated in accordance with the communications protocol that the start framebit sequence SOF has to be provided at the position of bits 0 to 2, and the end framebit sequence EOF at the position of bits 150 to 152 of the bit sequence transmitted from transponder 2. If it is detected during checking in block 28 that the bits received by base station 1 at the position of bits 150 to 152 in transmission signal US are formed by bit sequence "001", this end framebit sequence EOF is incorrect and a third rule of the communications protocol has been infringed.

If, during the previously described check in block 28, an error is detected and the reception-bit sequence BFT thereby infringes the second or third rule of the communications protocol, the processing of the reception method EV is resumed at block 27. As a result, the advantage is again obtained that the bits of the reception-bit sequence BFT that infringe a rule of the communications protocol are rejected, but the progressing of reception method EV is continued and therefore no time is lost.

In accordance with the first embodiment, the bits transmitted from transponder 2 are correctly received despite the weakly superimposed interference signal ST, for which reason the end framebit sequence EOF is recognized at a block 29. At a block 30, the reception-bit sequence BFT stored in buffer storage means 17 is transmitted as reception data ED to interface device 11, and the reception method EV is terminated at a block 31.

Interference bits SB2 from transponder 3 received following the end framebit sequence EOF will no longer be stored in buffer storage means 17 since it is stipulated by the communications protocol that, following valid conclusion of the transmitted reception data ED by end framebit sequence EOF, no more reception data ED is transmitted. This gives rise to the advantage that the interference bits SB2 are filtered out at bit level.

By virtue of the reception device 10 in accordance with the invention, the advantage is obtained that, in addition to redundancy information and framebit sequences for recognizing transmission errors, the rules of the communications protocol are also intensively used to filter out transmission errors at bit level. It is especially advantageous that the receipt of reception data ED by base station 1 is continued even if an error has been detected. As a result, communication between base station 1 and transponder 2 can not only be of a more secure and reliable nature, it can also be significantly accelerated, which is especially advantageous.

Figure 4:
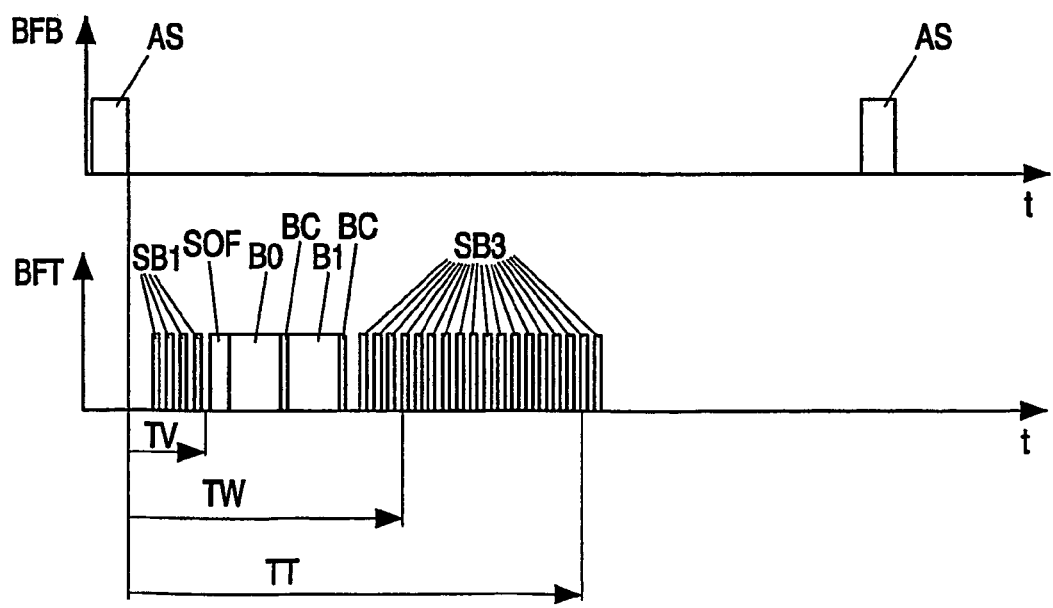
FIG. 4 shows bit sequences contained in a transmission signal in accordance with a second embodiment.

In accordance with a second embodiment of base station 1 shown in FIG. 4, transponder 2 transmits only the first two blocks B0 and B1 after prompt signal AS, and is subsequently removed from the field HF of base station 1 by the user. As a result, the third interference bits SB3 of transponder 3, which are very much weaker but still recognized by evaluation means 16, are stored in buffer storage means 17 from this instant onwards.

In this case, checking means 18 recognizes at block 28 during checking of the third interference bits SB3 that the block code BC of the third block B3 that is no longer transmitted from transponder 2 does not coincide with the third block B3 that is no longer transmitted, whereupon the processing is continued at block Blocks 23, 24, 25, 26, 28 and 27 are then run through until, at instant TTC=TT, it is established that the maximum reception period TT stipulated by the communications protocol has been reached, and the processing is continued at a block 32.

At block 32, checking means 18 checks whether communication error information KFI has previously been stored. This is always the case when, during the reception period, a bit from the reception-bit sequence BFT has been received at least once. In this case, checking means 18 emits the stored communication error information KFI to interface device 11 at a block 33. If no bit from the reception-bit sequence BFT has been received during the entire maximum reception period TT, checking means 18 emits exceeding-of-reception-period information TTI to interface device 11 at a block 34.

This gives rise to the advantage that, using the information sent to it, interface device 11 can initiate further steps. This might mean that a text "Please hold your electronic ticket closer to the ticket machine" is shown to the user on the display of interface device 11 if the exceeding-of-reception-period information TTI has been received by interface device 11. Likewise, interface device 11 can initiate the re-sending of prompt signal AS, or take other steps in order that valid reception data ED is received from transponder 2.

It may be mentioned that buffer storage means do not have to be provided in a reception device in accordance with the invention. In this case, each bit of the reception-bit sequence BFT determined by the evaluation means would be checked immediately by the checking means. The provision of buffer storage means is unnecessary particularly in the case where the means of the reception device is realized by hardware means and not by software means.

It may be mentioned that the reception method in accordance with the invention is also advantageous in the case of reception and transmission devices connected via conducting wires. It is especially advantageous, however, to provide this reception method in the case of reception and transmission devices operating with contactless communication.

It may be mentioned that periodic interference signal may also be emitted by other interference sources, such as defective electrical appliances or transmission devices from other communications systems.

The invention claimed is:

1. A reception device configured to receive a transmission signal adhering to a communications protocol, wherein a transmission device sends reception data to the reception device, the reception device comprising:
   means for receiving the transmission signal;
   means for evaluating the received transmission signal;
   means for emitting a bit sequence received in the transmission signal, wherein the bit sequence contains bits of reception data transmitted from the transmission device and bits of interference caused by an interference to the transmission signals;
   means for checking whether the received bit sequence infringes a rule of the communications protocol;
   wherein the reception device is designed to continue with the reception of the transmission signal and the checking of the received bit sequence following the occurrence of an infringement of the communications protocol; and
   means for checking whether a first segment of bits of the received bit sequence are already received before an expiry of a lead period that starts from the start of a reception period, wherein a first rule of the communications protocol is infringed, and wherein the reception device rejects the first segment of bits of the received bit sequence and continues to receive the transmission signal and to check another segment of bits of the received bit sequence that are received following expiry of the lead period.

2. A reception device as claimed in claim 1, further comprising:
means for emitting communication error information indicating an infringed rule in response to an infringement of a rule of the communications protocol.

3. A reception device as claimed in claim 2, further comprising:
means for checking whether, starting from the range of a reception period, a maximum reception period is already expired;
means for emitting exceeding-of-reception-period information in response to the expiration of the maximum reception period; and
means for emitting communication error information in response to a detection of an infringement of the communications protocol during the reception period.

4. A reception device as claimed in claim 3, further comprising means for determining the reception period that is already passed, wherein a measurement is interrupted by a counter means when a further bit is received in the transmission signal, and wherein the measurement is resumed by the counter means when an infringement of a rule of the communications protocol is established by the checking means.

5. A reception device as claimed in claim 2, further comprising:
means for storing the received bit sequence emitted by the evaluation means; and
means for storing detected communication error information.

6. A reception device as claimed in claim 1, further comprising means for providing the reception device in a base station, wherein the reception device enables contactless communication with at least one transponder forming the transmission device.

7. A reception method of receiving a transmission signal that adheres to a communications protocol, the reception method comprising:
receiving at a reception device a transmission signal from a transmission device, wherein the reception device comprises processing and storage means for performing operations of the reception method;
evaluating the received transmission signal;
emitting a bit sequence received in the transmission signal, wherein the bit sequence contains bits of reception data transmitted from the transmission device and bits of interference caused by an interference to the transmission signal;
checking whether the received bit sequence infringes a rule of the communications protocol;
continuing the reception of the transmission signals at the reception device and the checking of the received bit sequence in response to an infringement of the communications protocol; and
checking the received bit sequence as to whether the first bits of the received bit sequence are already received before an expiry of a lead period that starts from a start of a reception period and continuing to receive the transmission signal and to check the bits of the received bit sequence received following expiry of the lead period, wherein a first rule of the communications protocol is infringed, and wherein the bits of the received bit sequence received before the expiry of lead period are rejected.

8. A reception method as claimed in claim 7, further comprising emitting communication error information, wherein the communication error information indicates an infringement of a rule of the communications protocol.

9. A reception method as claimed in claim 8, further comprising:
checking, from the start of a reception period, whether a maximum reception period is already expired;
emitting exceeding-of-reception-period information in response to the expiration of the maximum reception period; and
emitting communication error information in response to a detection of an infringement of the communications protocol during the reception period.

10. A reception method as claimed in claim 9, further comprising determining that the reception period is already passed, wherein a measurement is interrupted when a further bit is received in the transmission signal, and wherein the measurement is continued when the infringement of a rule of the communications protocol is established.

11. A reception device configured to receive a transmission signal adhering to a communications protocol, wherein a transmission device sends reception data to the reception device, the reception device comprising:
means for receiving the transmission signal;
means for evaluating the received transmission signal;
means for emitting a bit sequence received in the transmission signal, wherein the bit sequence contains bits of reception data transmitted from the transmission device and bits of interference caused by an interference to the transmission signals;
means for checking whether the received bit sequence infringes a rule of the communications protocol;
wherein the reception device is designed to continue with the reception of the transmission signal and the checking of the received bit sequence following the occurrence of an infringement of the communications protocol; and
means for checking the received bit sequence as to whether redundancy information contained at a predetermined bit position in valid reception data identifies defective bits in the received bit sequence, wherein a second rule of the communications protocol is infringed, and wherein the reception device rejects the bits of the received bit sequence identified as defective continues to receive the transmission signal and to check a subsequent received bit sequence.

12. A reception device as claimed in claim 11, further comprising:
means for emitting communication error information indicating an infringed rule in response to an infringement of a rule of the communications protocol.

13. A reception device as claimed in claim 12, further comprising:
means for checking whether, starting from the range of a reception period, a maximum reception period is already expired;
means for emitting exceeding-of-reception-period information in response to the expiration of the maximum reception period; and
means for emitting communication error information in response to a detection of an infringement of the communications protocol during the reception period.

14. A reception device as claimed in claim 13, further comprising means for determining the reception period that is already passed, wherein a measurement is interrupted by a counter means when a further bit is received in the transmission signal, and wherein the measurement is resumed by the counter means when an infringement of a rule of the communications protocol is established by the checking means.

15. A reception device as claimed in claim 12, further comprising:
   means for storing the received bit sequence emitted by the evaluation means; and
   means for storing detected communication error information.

16. A reception device as claimed in claim 11, further comprising means for providing the reception device in a base station, wherein the reception device enables contactless communication with at least one transponder forming the transmission device.

17. A reception method of receiving a transmission signal that adheres to a communications protocol, the reception method comprising:
   receiving at a reception device a transmission signal from a transmission device, wherein the reception device comprises processing and storage means for performing operations of the reception method;
   evaluating the received transmission signal;
   emitting a bit sequence received in the transmission signal, wherein the bit sequence contains bits of reception data transmitted from the transmission device and bits of interference caused by an interference to the transmission signal;
   checking whether the received bit sequence infringes a rule of the communications protocol;
   continuing the reception of the transmission signals at the reception device and the checking of the received bit sequence in response to an infringement of the communications protocol; and
   checking as to whether redundancy information contained at a predetermined bit position in valid reception data identifies defective bits in the received bit sequence, wherein a second rule of the communications protocol is infringed, and wherein the bits of the received bit sequence identified as defective are rejected, and the reception of the transmission signal and the checking of the subsequent bit sequence received continue.

18. A reception method as claimed in claim 17, further comprising emitting communication error information, wherein the communication error information indicates an infringement of a rule of the communications protocol.

19. A reception method as claimed in claim 18, further comprising:
   checking, from the start of a reception period, whether a maximum reception period is already expired;
   emitting exceeding-of-reception-period information in response to the expiration of the maximum reception period; and
   emitting communication error information in response to a detection of an infringement of the communications protocol during the reception period.

20. A reception method as claimed in claim 19, further comprising determining that the reception period is already passed, wherein a measurement is interrupted when a further bit is received in the transmission signal, and wherein the measurement is continued when the infringement of a rule of the communications protocol is established.

21. A reception device configured to receive a transmission signal adhering to a communications protocol, wherein a transmission device sends reception data to the reception device, the reception device comprising:
   means for receiving the transmission signal;
   means for evaluating the received transmission signal;
   means for emitting a bit sequence received in the transmission signal, wherein the bit sequence contains bits of reception data transmitted from the transmission device and bits of interference caused by an interference to the transmission signals;
   means for checking whether the received bit sequence infringes a rule of the communications protocol;
   wherein the reception device is designed to continue with the reception of the transmission signal and the checking of the received bit sequence following the occurrence of an infringement of the communications protocol; and
   means for checking the received bit sequence, as to whether a framebit sequence predetermined by the communications protocol is missing from a predetermined bit position in the received bit sequence, wherein a third rule of the communications protocol is infringed, and wherein the reception device rejects the bit sequence already received and continues to receive the transmission signal and to check a subsequent received bit sequence.

22. A reception device as claimed in claim 21, further comprising:
   means for emitting communication error information indicating an infringed rule in response to an infringement of a rule of the communications protocol.

23. A reception device as claimed in claim 22, further comprising:
   means for checking whether, starting from the range of a reception period, a maximum reception period is already expired;
   means for emitting exceeding-of-reception-period information in response to the expiration of the maximum reception period; and
   means for emitting communication error information in response to a detection of an infringement of the communications protocol during the reception period.

24. A reception device as claimed in claim 23, further comprising means for determining the reception period that is already passed, wherein a measurement is interrupted by a counter means when a further bit is received in the transmission signal, and wherein the measurement is resumed by the counter means when an infringement of a rule of the communications protocol is established by the checking means.

25. A reception device as claimed in claim 22, further comprising:
   means for storing the received bit sequence emitted by the evaluation means; and
   means for storing detected communication error information.

26. A reception device as claimed in claim 21, further comprising means for providing the reception device in a base station, wherein the reception device enables contactless communication with at least one transponder forming the transmission device.

27. A reception method of receiving a transmission signal that adheres to a communications protocol, the reception method comprising:
   receiving at a reception device a transmission signal from a transmission device, wherein the reception device comprises processing and storage means for performing operations of the reception method;
   evaluating the received transmission signal;
   emitting a bit sequence received in the transmission signal, wherein the bit sequence contains bits of reception data transmitted from the transmission device and bits of interference caused by an interference to the transmission signal;

checking whether the received bit sequence infringes a rule of the communications protocol;

continuing the reception of the transmission signals at the reception device and the checking of the received bit sequence in response to an infringement of the communications protocol; and checking as to whether a framebit sequence predetermined by the communications protocol is missing from a predetermined bit position in the received bit sequence, wherein a third rule of the communications protocol is infringed, and wherein the bits identified as defective in the received bit sequence are rejected, and the reception of the transmission signal and the checking of the subsequent bit sequence received continue.

28. A reception method as claimed in claim 27, further comprising emitting communication error information, wherein the communication error information indicates an infringement of a rule of the communications protocol.

29. A reception method as claimed in claim 28, further comprising:

checking, from the start of a reception period, whether a maximum reception period is already expired;

emitting exceeding-of-reception-period information in response to the expiration of the maximum reception period; and emitting communication error information in response to a detection of an infringement of the communications protocol during the reception period.

30. A reception method as claimed in claim 29, further comprising determining that the reception period is already passed, wherein a measurement is interrupted when a further bit is received in the transmission signal, and wherein the measurement is continued when the infringement of a rule of the communications protocol is established.

* * * * *